(12) United States Patent
Lee et al.

(10) Patent No.: US 11,236,656 B2
(45) Date of Patent: Feb. 1, 2022

(54) VEHICLE EXHAUST GAS ABATEMENT APPARATUS

(71) Applicant: FiberTech CO., LTD, Paju-si (KR)

(72) Inventors: Se Young Lee, Seoul (KR); Jong Hun Woo, Paju-si (KR); Dae Hee Kim, Paju-si (KR); Hyo Jong Gil, Paju-si (KR); Duk Euy Lee, Goyang-si (KR); Taek Heon Lee, Goyang-si (KR)

(73) Assignee: FiberTech CO., LTD

( * ) Notice: Subject to any disclaimer, the term of this patent is extended or adjusted under 35 U.S.C. 154(b) by 0 days.

(21) Appl. No.: 17/044,864

(22) PCT Filed: Jul. 13, 2018

(86) PCT No.: PCT/KR2018/007991
§ 371 (c)(1),
(2) Date: Oct. 1, 2020

(87) PCT Pub. No.: WO2019/194366
PCT Pub. Date: Oct. 10, 2019

(65) Prior Publication Data
US 2021/0180498 A1    Jun. 17, 2021

(30) Foreign Application Priority Data
Apr. 3, 2018    (KR) .......................... 10-2018-0038860

(51) Int. Cl.
*F01N 3/20*    (2006.01)
*F01N 3/28*    (2006.01)

(52) U.S. Cl.
CPC ......... *F01N 3/2013* (2013.01); *F01N 3/2033* (2013.01); *F01N 3/204* (2013.01);
(Continued)

(58) Field of Classification Search
CPC .... F01N 2240/14; F01N 3/025; F01N 3/2033; F01N 2230/08; F01N 3/26; F01N 3/0256
See application file for complete search history.

(56) References Cited

U.S. PATENT DOCUMENTS 4,610,138 A * 9/1986 Shinzawa ............... F01N 3/025
60/286
5,802,844 A * 9/1998 Lee ....................... F01N 3/2033
60/274
(Continued)

FOREIGN PATENT DOCUMENTS

JP    2010096122 A    4/2010
JP    2013234577 A    11/2013
(Continued)

OTHER PUBLICATIONS

International Search Report for PCT/KR2018/007991 dated Jan. 2, 2019.

*Primary Examiner* — Anthony Ayala Delgado
(74) *Attorney, Agent, or Firm* — Renaissance IP Law Group LLP

(57) ABSTRACT

The present inventive concept relates to a vehicle exhaust gas abatement apparatus. The vehicle exhaust gas abatement apparatus includes: an exhaust gas discharging unit having an exhaust gas discharging pass which is formed on one side thereof and along which an exhaust gas generated from an engine of a vehicle is discharged; a catalytic converter connected to a rear end of the exhaust gas discharging unit along a direction in which the exhaust gas is discharged and removing harmful components in the exhaust gas using a catalyst; and a surface combustion unit coupled to one side of the exhaust gas discharging unit and heating an inner portion of the exhaust gas discharging unit so that the
(Continued)

exhaust gas is heated to an activation temperature or higher of the catalyst and then arrives at the catalytic converter.

5 Claims, 6 Drawing Sheets

(52) U.S. Cl.
CPC ............ *F01N 3/28* (2013.01); *F01N 2550/02* (2013.01); *F01N 2900/1626* (2013.01)

(56) References Cited

U.S. PATENT DOCUMENTS

| | | | | |
|---|---|---|---|---|
| 7,534,401 B2 * | 5/2009 | Keppel | ................. | B01D 53/32 422/186.21 |
| 7,581,389 B2 * | 9/2009 | Crawley | ................. | F01N 3/025 60/297 |
| 8,209,971 B2 * | 7/2012 | Kalantarifiroozabad | ................. | F01N 3/025 60/303 |
| 8,464,516 B2 * | 6/2013 | Bell | ................. | F01N 13/1888 60/286 |
| 9,016,051 B2 * | 4/2015 | Iwasaki | ................. | F01N 3/025 60/303 |
| 9,027,332 B2 * | 5/2015 | Olivier | ................. | F01N 11/00 60/303 |
| 9,206,724 B2 * | 12/2015 | Hirota | ................. | F01N 3/36 |
| 9,416,705 B2 * | 8/2016 | Tsumagari | ................. | F01N 5/02 |
| 2010/0146939 A1 * | 6/2010 | Sim | ................. | F01N 3/0256 60/286 |
| 2014/0237999 A1 * | 8/2014 | Olivier | ................. | F01N 3/36 60/303 |
| 2014/0238000 A1 * | 8/2014 | Olivier | ................. | F01N 3/0234 60/303 |

FOREIGN PATENT DOCUMENTS

| | | | |
|---|---|---|---|
| KR | 19990027818 A | | 4/1999 |
| KR | 101058836 B1 | | 8/2011 |
| KR | 101330255 B1 | | 11/2013 |
| KR | 101430061 B1 | * | 8/2014 |
| KR | 101867540 B1 | | 6/2018 |

* cited by examiner

VEHICLE EXHAUST GAS ABATEMENT APPARATUS

TECHNICAL FIELD

The present inventive concept relates to a vehicle exhaust gas abatement apparatus, and more particularly, to a vehicle exhaust gas abatement apparatus capable of contributing to preventing air and environmental pollution because it may effectively remove harmful components in an exhaust gas and then discharging the exhaust gas at the initial stage of start by significantly reducing an activation temperature arrival time of a catalyst unlike a conventional electric heating manner and an exhaust gas discharging unit itself may directly combust the exhaust gas to abate a predetermined amount of harmful components and smoke in the exhaust gas in advance and then move the exhaust gas to a catalytic converter, and significantly improving practical utilization because it may be easily applied to any place due to a compact and efficient structure.

BACKGROUND ART

Recently, as vehicles increase in downtown areas, it has been reported that an exhaust gas generated from vehicle engines is a main cause of air pollution.

Particularly, because a large amount of harmful components such as CO, HC, and NOx, which are harmful to a human body, are contained the exhaust gas emitted from the vehicle engine (hereinafter referred to as an engine), in a case where the exhaust gas is discharged as it is, air pollution is caused.

Therefore, recently, a technology for removing the harmful components in the exhaust gas by installing a catalytic converter on one side of an exhaust pipe of the vehicle has been suggested.

In a vehicle in which the catalytic converter is used, a catalyst should be activated in order to perform its function, that is, a function of removing the harmful components in the exhaust gas. It has been known that an activation temperature of the catalyst is approximately 300 to 400° C. or higher.

Meanwhile, in a case where the vehicle is driving, a temperature of the exhaust gas is much higher than the above-described activation temperature of the catalyst, and an operation of removing the harmful components of the exhaust gas by the catalyst may be performed well.

However, at the initial stage of start of the engine, that is, in a so-called cold state, the temperature of the exhaust gas is low and a cylinder head and an exhaust manifold are also cooled, such that a predetermined time cannot but be required for the catalyst to be heated by the discharged exhaust gas to arrive at the activation temperature, and the operation of removing the harmful components of the exhaust gas by the catalyst cannot be performed at all during this time. Therefore, the exhaust gas containing the harmful components cannot but be inevitably discharged into the atmosphere as it is. It has been reported that more than 95% of hydrocarbon compounds are discharged at the initial stage of the start in fact.

Therefore, in order to solve such a problem, an electric heating-type catalytic converter as illustrated in FIG. 1 has been suggested.

In a catalytic heating-type catalytic converter of FIG. 1, catalysts 2 may be heated in advance by using electric heat plates 6 and 7 in the vicinity of the catalysts 2. The electric heat plates 6 and 7 allow the catalysts 2 to be able to be heated in advance while generating heat by electricity.

However, since this manner is a manner of disposing the electric heat plates 6 and 7 in the vicinity of the catalysts 2 and heating the catalysts 2 by the electricity, it is difficult to shorten a heating time required to heat the catalysts 2 and a practical effect is not high due to a limitation of an electric capacity of the vehicle. Considering such a situation, there is a need to develop a technology for a vehicle exhaust gas abatement apparatus of a new concept that has not been known in the related art.

Related art documents related to the technical field of the present inventive concept include Korean Patent Application No. 10-1997-0062345, Korean Patent Application No. 10-2003-0070728, Korean Utility Model No. 20-1993-0028110, and Korean Utility Model No. 20-2002-0008298.

DISCLOSURE

Technical Problem

An object of the present inventive concept is to provide a vehicle exhaust gas abatement apparatus capable of contributing to preventing air and environmental pollution because it may effectively remove harmful components in an exhaust gas and then discharging the exhaust gas at the initial stage of start by significantly reducing an activation temperature arrival time of a catalyst unlike a conventional electric heating manner and an exhaust gas discharging unit itself may directly combust the exhaust gas to abate a predetermined amount of harmful components and smoke in the exhaust gas in advance and then move the exhaust gas to a catalytic converter, and significantly improving practical utilization because it may be easily applied to any place due to a compact and efficient structure.

Further, another object of the present inventive concept is to provide a vehicle exhaust gas abatement apparatus capable of abating harmful components and smoke contained in an exhaust gas.

Technical Solution

In order to accomplish the above objects, there is provided a vehicle exhaust gas abatement apparatus including: an exhaust gas discharging unit having an exhaust gas discharging pass which is formed on one side thereof and along which an exhaust gas generated from an engine of a vehicle is discharged; a catalytic converter connected to a rear end of the exhaust gas discharging unit along a direction in which the exhaust gas is discharged and removing harmful components in the exhaust gas using a catalyst; and a surface combustion unit coupled to one side of the exhaust gas discharging unit and heating an inner portion of the exhaust gas discharging unit so that the exhaust gas is heated to an activation temperature or higher of the catalyst and then arrives at the catalytic converter.

The surface combustion unit may be a fuel-type surface combustion unit heating an inner portion of the exhaust gas discharging unit by heat of a flame via a fuel.

The exhaust gas discharging unit may include: a discharging housing portion which has a pipe shape and forms a place where the fuel-type surface combustion unit is coupled; and an engine connection portion which is coupled to one side of the discharging housing portion and is connected to the engine.

The exhaust gas discharging unit may further include an inner partition wall portion which is disposed inside the discharging housing portion in a radial direction with a spaced interval interposed between the inner partition wall portion and the discharging housing portion and has a pipe shape.

The exhaust gas discharging unit may further include a mixing duct portion which is coupled to the other side of the discharging housing portion and is connected to the catalytic converter and in which the exhaust gas and the heat by the flame are mixed with each other.

The fuel-type surface combustion unit may include: a unit body portion which is coupled to the discharging housing portion so as to surround the discharging housing portion in an open portion of the discharging housing portion and has an inner portion forming an empty space portion; and a supply connector which includes a fuel supply unit supplying a fuel and an air supply unit supplying air to be mixed with the fuel and is coupled to the unit body portion to supply the fuel and the air to the space portion in the unit body portion.

The fuel-type surface combustion unit may include: at least one distribution guide which is provided in the space portion in the unit body portion and distributes and guides the fuel and the air directed to the space portion; a surface combustion mat which is disposed in an opening portion of the unit body portion in contact with the discharging housing portion; and an ignition module which is provided on one side of the unit body portion and allows the surface combustion mat to ignite.

The vehicle exhaust gas abatement apparatus may further include: an engine start sensor sensing whether or not the engine is started; and a controller controlling an operation of the surface combustion unit based on a sensing signal of the engine start sensor.

The vehicle exhaust gas abatement apparatus may further include a timer connected to the controller and setting an operation time of the surface combustion unit, wherein the fuel is selected from methane, butane, propane, a self-fuel.

Advantageous Effects

According to the present inventive concept, it is possible to contribute to preventing air and environmental pollution because a vehicle exhaust gas abatement apparatus may effectively remove harmful components in an exhaust gas and then discharging the exhaust gas at the initial stage of start by significantly reducing an activation temperature arrival time of a catalyst unlike a conventional electric heating manner and an exhaust gas discharging unit itself may directly combust the exhaust gas to abate a predetermined amount of harmful components and smoke in the exhaust gas in advance and then move the exhaust gas to a catalytic converter and significantly improve practical utilization because the vehicle exhaust gas abatement apparatus may be easily applied to any place due to a compact and efficient structure.

DETAILED DESCRIPTION

Figure 1:
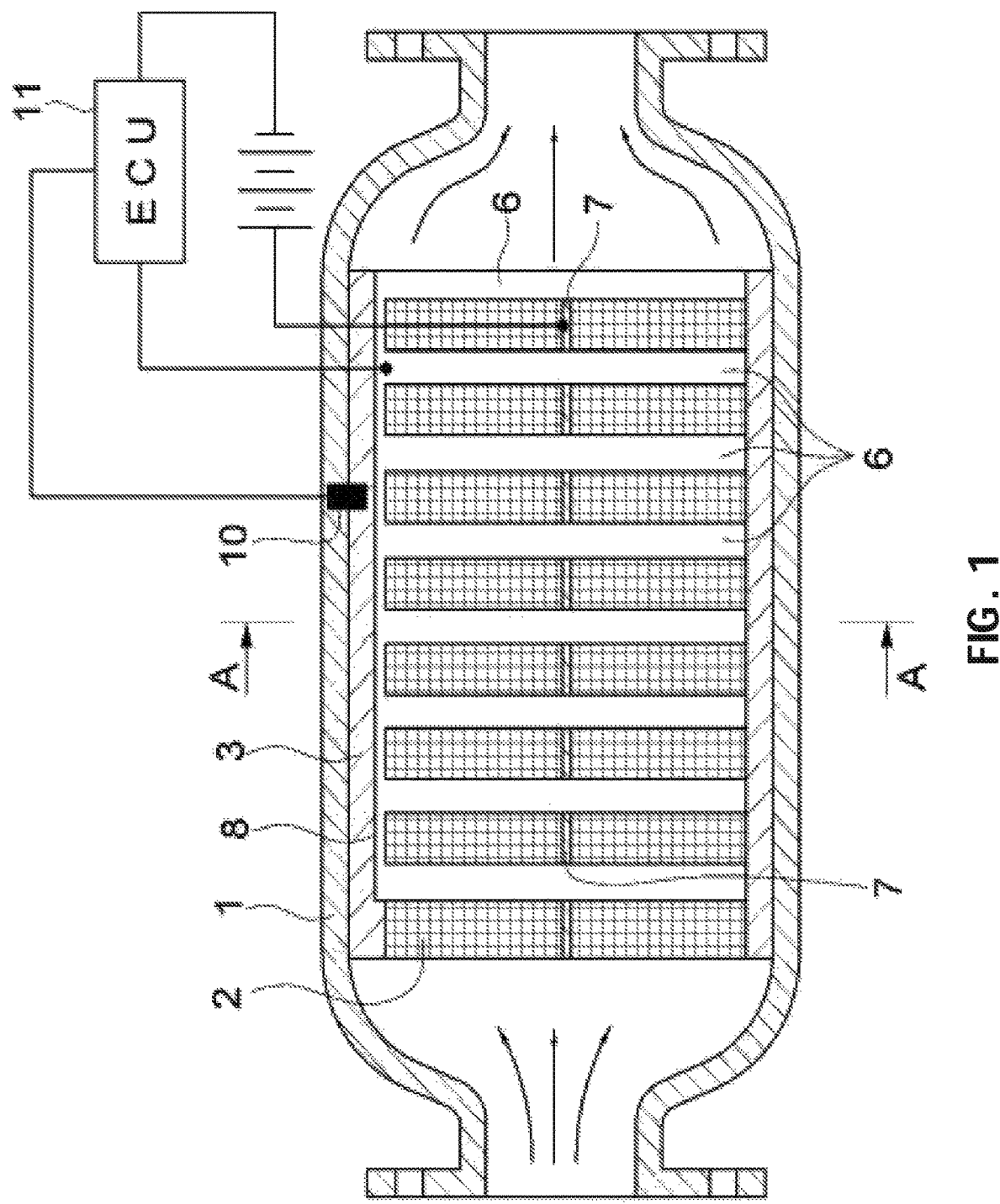
FIG. 1 is a view illustrating a structure of a catalytic heating-type catalytic converter for early activation of a catalyst at the time of cold start of an engine according to the related art.

Advantages and features of the present inventive concept and methods accomplishing them will become apparent from embodiments described below in detail with reference to the accompanying drawings.

However, the present inventive concept is not limited to embodiments set forth herein, but will be modified in various different forms.

In the present specification, the present embodiment may be provided so that the present disclosure will be thorough and complete and will fully convey the scope of the invention to those skilled in the art to which the present inventive concept pertains. In addition, the present inventive concept is only defined by the scope of the claims.

Therefore, in some embodiments, well-known components, well-known operations, and well-known technologies will not be described in detail in order to avoid obscure interpretation of the present inventive concept.

The same reference numerals denote the same components throughout the specification. In addition, terms used (mentioned) in the present disclosure are for describing embodiments rather than limiting the present inventive concept.

In the present specification, a singular form includes a plural form unless explicitly stated otherwise. In addition, components and operations (actions) mentioned by terms 'include (or comprise)' do not exclude the presence or addition of one or more other components and operations.

Unless defined otherwise, all terms (including technical and scientific terms) used in the present specification may be used as meanings that may be commonly understood by those skilled in the art to which the present inventive concept pertains.

In addition, terms defined in generally used dictionaries are not ideally or excessively interpreted unless they are defined.

Hereinafter, embodiments of the present inventive concept will be described with reference to the accompanying drawings.

Figure 2:
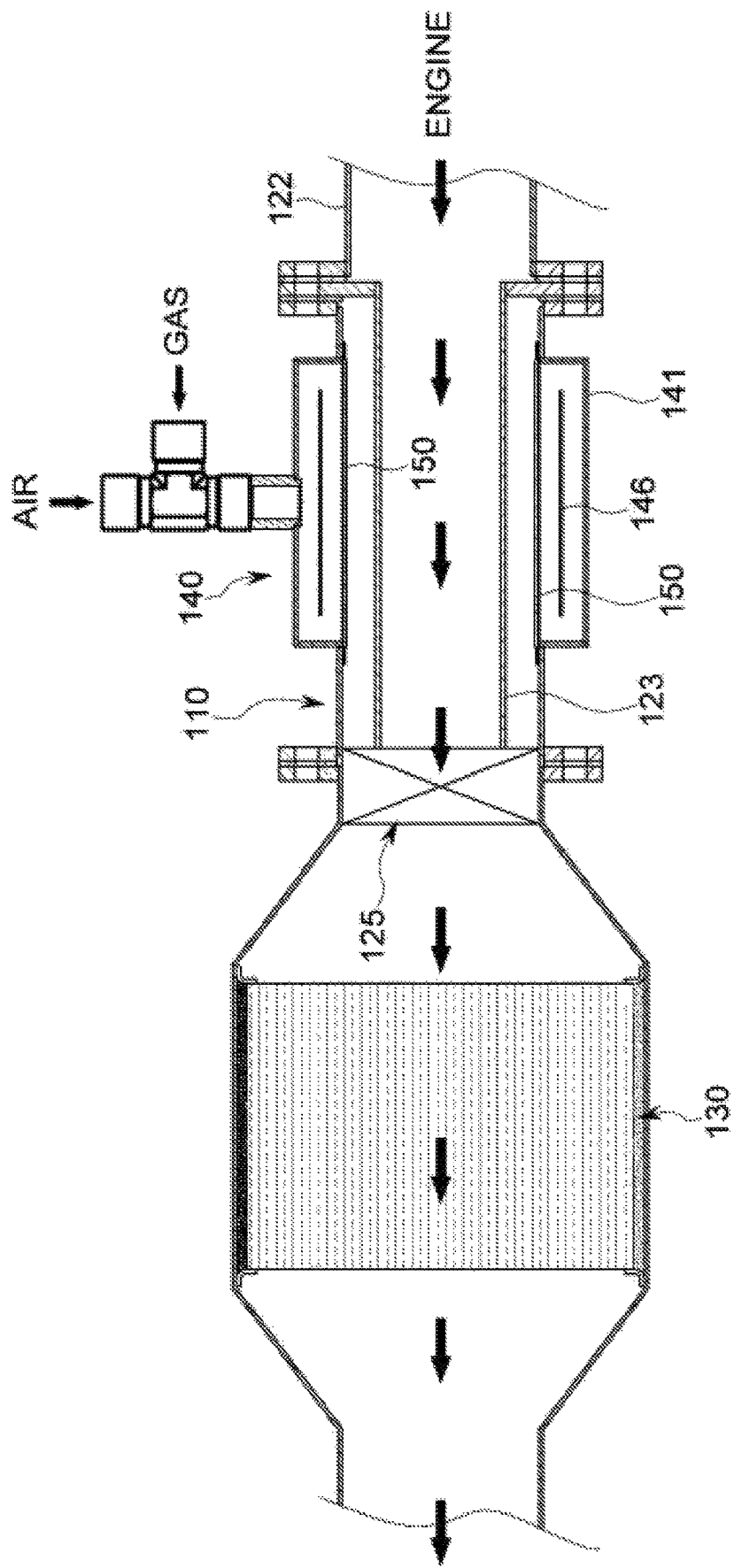
FIG. 2 is a view illustrating a structure of a vehicle exhaust gas abatement apparatus according to a first embodiment of the present inventive concept.
Figure 3:
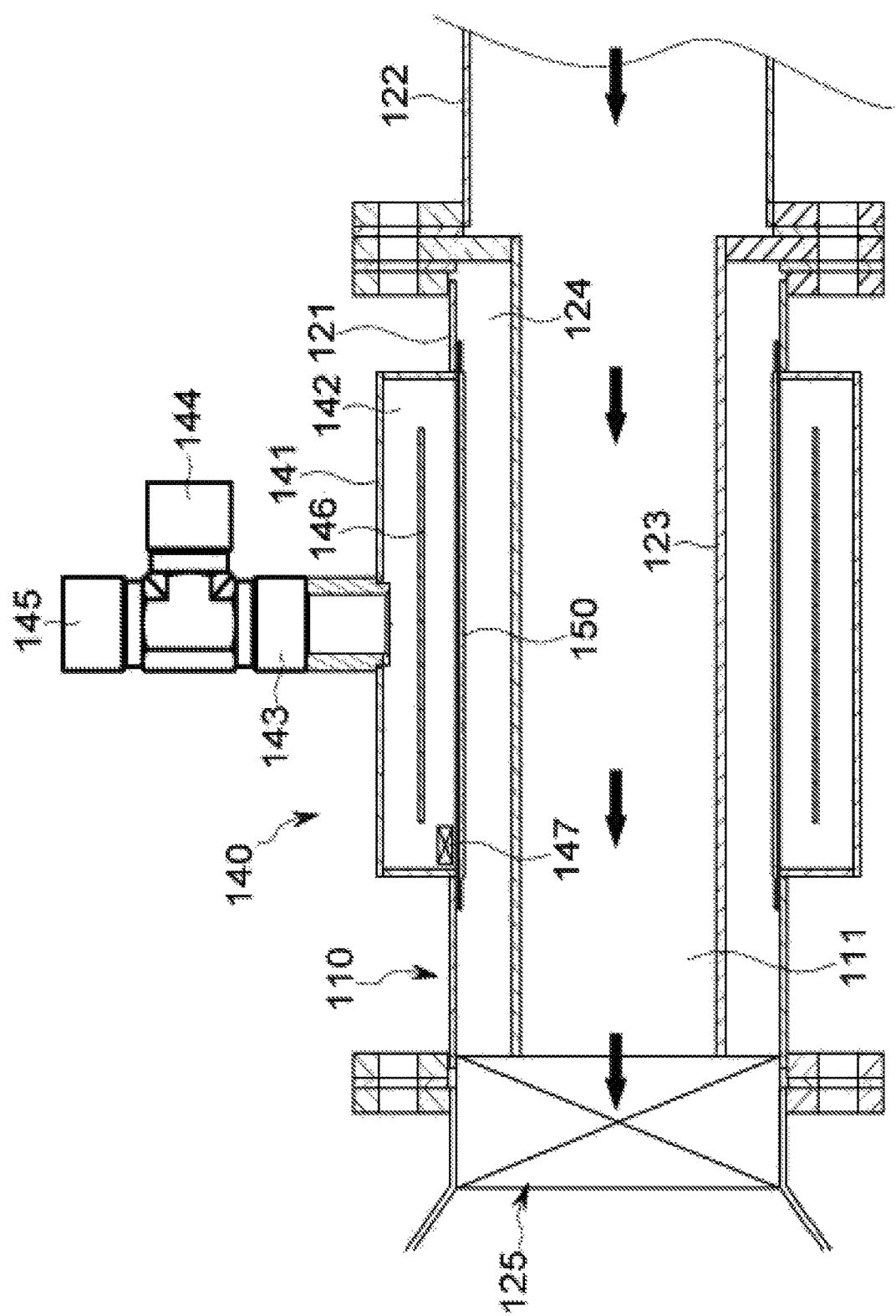
FIG. 3 is an enlarged view of main portions of FIG. 2.
Figure 4:
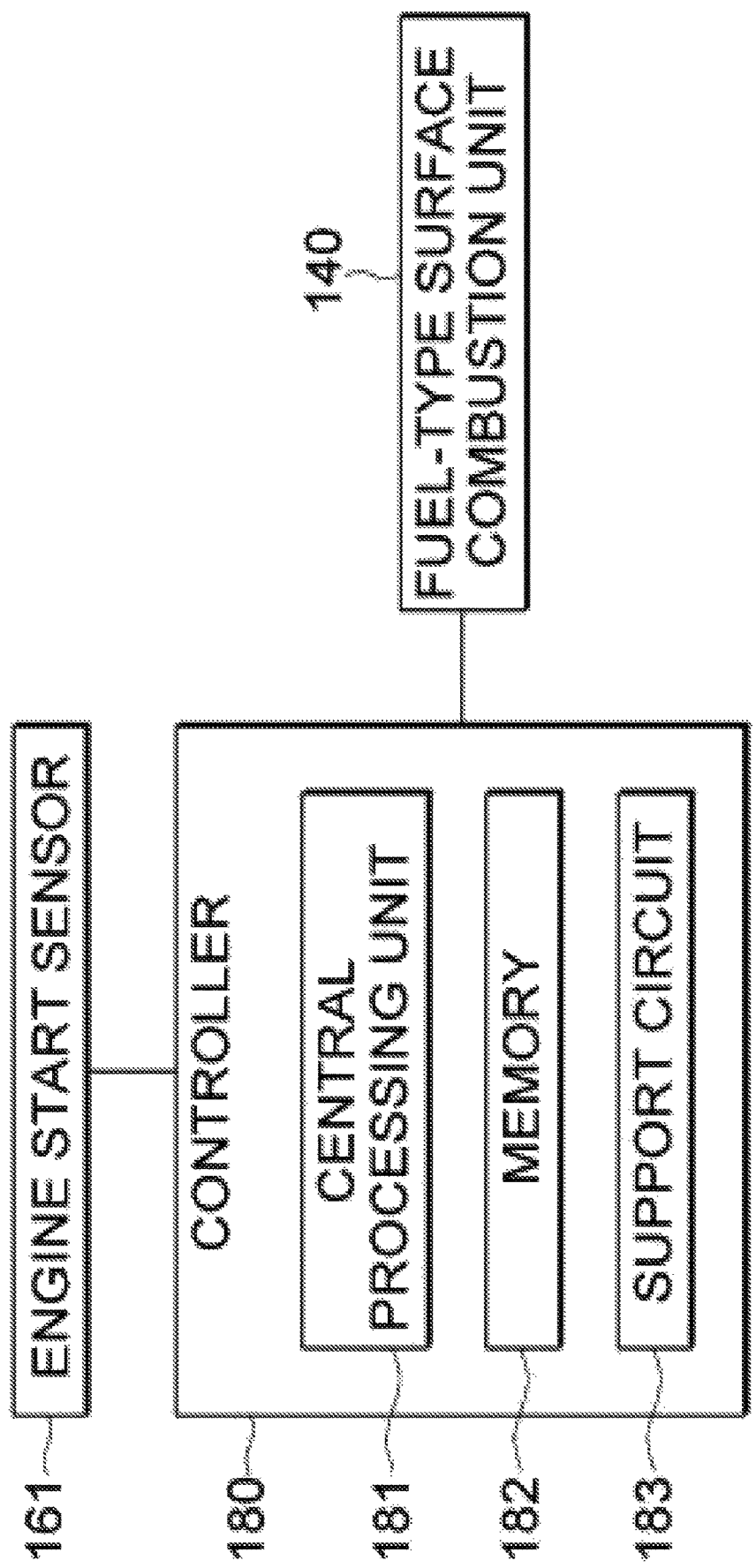
FIG. 4 is a control block diagram of FIG. 2.

FIG. 2 is a view illustrating a structure of a vehicle exhaust gas abatement apparatus according to a first embodiment of the present inventive concept, FIG. 3 is an enlarged view of main portions of FIG. 2, and FIG. 4 is a control block diagram of FIG. 2.

Referring to FIGS. 2 to 4, the vehicle exhaust gas abatement apparatus according to the present embodiment may contribute to preventing air and environmental pollution because it may effectively remove harmful components in an exhaust gas and then discharge the exhaust gas at the initial stage of start by significantly reducing an activation temperature arrival time of a catalyst unlike a conventional electric heating manner, and significantly improve practical utilization because it may be easily applied to any place due to a compact and efficient structure.

The vehicle exhaust gas abatement apparatus according to the present embodiment capable of providing such an effect may include an exhaust gas discharging unit 110, a catalytic converter 130, and a surface combustion unit 140.

The exhaust gas discharging unit 110 forms a place where an exhaust gas generated from an engine of a vehicle is discharged. Therefore, an exhaust gas discharging path 111 along which exhaust gas is discharged is formed in the exhaust gas discharging unit 110. One end portion of the exhaust gas discharging unit 110 may be connected to an engine as illustrated in FIG. 2.

The exhaust gas discharging unit 110 includes a discharging housing portion 121 and an engine connection portion 122. The discharging housing portion 121 and the engine connection portion 122 may be flange-coupled to each other together with a mixing duct portion 125, and a coupling or decoupling operation thereof may become easy. Therefore, installation and maintenance may become easy.

The discharging housing portion 121 has a pipe shape. The discharging housing portion 121 forms a place where the surface combustion unit 140 is coupled. One side of the discharging housing portion 121 to which the surface combustion unit 140 is coupled is opened.

An inner partition wall portion 123 is provided inside the discharging housing portion 121. The inner partition wall portion 123 is a pipe-shaped structure disposed inside the discharging housing portion 121 in a radial direction with a spaced interval 124 interposed between the inner partition wall portion 123 and the discharging housing portion 121, and serves to prevent a flame due to the exhaust gas.

The engine connection portion 122 is a kind of pipe coupled to one side of the discharging housing portion 121 and connected to the engine. The engine connection portion 122 is formed to be larger than a diameter of the inner partition wall portion 123. The exhaust gas discharging path 111 refers to an internal space of the engine connection portion 122 and the inner partition wall portion 123.

In the present embodiment, the exhaust gas discharging unit 110 further includes the mixing duct portion 125. The mixing duct portion 125 is a portion coupled to the other side of the discharging housing portion 121 and connected to the catalytic converter 130, and forms a place where the exhaust gas and heat by the flame may be secondarily mixed with each other and then directed to the catalytic converter 130.

As described later in detail, in a case of the present embodiment, the exhaust gas is directed to the mixing duct portion 125 while primarily temperature-rising by the surface combustion unit 140, is completely mixed by the heat in the mixing duct portion 125, and is then discharged to the catalytic converter 130. Therefore, it is possible to effectively remove harmful components in the exhaust gas even in initial start. Since a temperature of the mixing duct unit 125 is actually 300 to 400° C. or higher, that is, 400° C. or higher, which is an activation temperature of a catalyst, it may be very helpful in activating the catalyst of a rear end.

The catalytic converter 130 is a device connected to a rear end of the exhaust gas discharging unit 110 along a direction in which the exhaust gas is discharged, and serves to remove the harmful components in the exhaust gas using the catalyst. A general catalytic converter may be used as the catalytic converter 130 as it is.

Meanwhile, the surface combustion unit 140 is coupled to one side of the exhaust gas discharging unit 110, and serves to combust a surface of the exhaust gas discharging unit 110 so that the exhaust gas may be heated to the activation temperature or higher of the catalyst before arriving at the catalytic converter 130.

In the present embodiment, a fuel-type surface combustion unit 140 combusting the surface of the exhaust gas discharging unit 110 by heat of a flame via a fuel is used as the surface combustion unit 140.

Therefore, the present embodiment is different from the related art of FIG. 1 that uses an electric heating method, and a time required for heating the exhaust gas at the time of initial start may be significantly shortened as compared with the related art. Therefore, it is possible to prevent a phenomenon in which the harmful components of the exhaust gas are discharged into the atmosphere as they are due to the deactivation of the catalyst as in the related art.

The fuel-type surface combustion unit 140 may include a unit body portion 141 and a supply connector 143.

The unit body portion 141 is a cylindrical structure coupled to the discharging housing portion 121 so as to surround the discharging housing portion 121 in an open portion of the discharging housing portion 121. An inner portion of the unit body portion 141 forms an empty space portion 142.

The supply connector 143 includes a fuel supply unit 144 supplying a fuel and an air supply unit 145 supplying air to be mixed with the fuel and is coupled to the unit body portion 141 to serve to supply the fuel and the air to the space portion 142 in the unit body portion 141.

The fuel supplied to the unit body portion 141 by the fuel supply unit 144 of the supply connector 143 may be a gas such as methane, butane, or propane, and it may be considered to use a cartridge containing the gas in order to supply such a gas fuel.

However, a self-fuel, for example, diesel in a case of a diesel vehicle may be used as fuel, and all of these matters should fall within the scope of the present inventive concept.

Meanwhile, a distribution guide 146, a surface combustion mat 150, and an ignition module 147 may be provided in the unit body portion 141.

The distribution guide 146 is provided in the space portion 142 in the unit body portion 141 and serves to distribute and guide the fuel and the air directed to the space portion 142 through the supply connector 143.

In other words, the fuel and the air may be guided while spreading to the entire region of the space portion 142 in the unit body portion 141 due to the distribution guide 146. Therefore, surface combustion in a large area may become possible, and it is very helpful in heating and discharging the exhaust gas in advance.

The surface combustion mat 150 is a mat disposed in an opening portion of the unit body portion 141 in contact with the discharging housing portion 121, and forms a place where a flame is substantially generated.

Since the surface combustion mat 150 is disposed along a circumference of the discharging housing portion 121 like a pipe and the flame is generated in the surface combustion mat 150, efficiency of heating the discharged exhaust gas may be improved.

The ignition module 147 is a device provided on one side of the unit body portion 141 and allowing the surface combustion mat 150 to ignite. The ignition module 147 may be remotely operated.

Meanwhile, the vehicle exhaust gas abatement apparatus 100 according to the present embodiment further includes an engine start sensor 161 and a controller 180.

The engine start sensor 161 is a kind of sensor sensing whether or not the engine is started. In addition, the controller 180 controls an operation of the fuel-type surface combustion unit 140 based on a sensing signal of the engine start sensor 161.

The controller 180 performing such a role may include a central processing unit (CPU) 181, a memory 182, and a support circuit 183.

The central processing unit 181 is one of various computer processors capable of being industrially applied in order to control the operation of the fuel-type surface combustion unit 140 based on the sensing signal of the engine start sensor 161 in the present embodiment.

The memory 182 is connected to the central processing unit 181. The memory 182 may be installed at a local place or a remote place as a computer-readable recording medium, and may be at least one or more readily available memories such as random access memory (RAM), a read only memory (ROM), a floppy disk, a hard disk, or any digital storage form.

The support circuit 183 is coupled to the central processing unit 181 to support a typical operation of the processor. The support circuit 183 may include a cache, a power supply, a clock circuit, an input/output circuit, a subsystem, and the like.

In the present embodiment, the controller 180 controls the operation of the fuel-type surface combustion unit 140 based on the sensing signal of the engine start sensor 161, and such a series of control processes or the like may be stored in the memory 182. Typically, a software routine may be stored in memory 182. The software routine may also be stored or executed by other central processing units (not illustrated).

It has been described that the processes according to the present inventive concept are executed by the software routine, but at least some of the processes according to the present inventive concept may also be performed by hardware. As such, the processes according to the present inventive concept may be implemented by software executed on a computer system, be implemented by hardware such as an integrated circuit, or be implemented by a combination of software and hardware.

Hereinafter, an action of the vehicle exhaust gas abatement apparatus according to the present embodiment will be described.

A driver starts the engine. In this case, the engine start sensor 161 senses whether or not the engine is started and transmits information to the controller 180, and the controller 180 controls the fuel-type surface combustion unit 140 to be operated.

When the fuel-type surface combustion unit 140 is operated by the control of the controller 180, the fuel and the air are supplied through the supply connector 143, and the flame is generated in the surface combustion mat 150 by an action of the ignition module 147, such that the exhaust gas discharged along the exhaust gas discharging path 111 may be heated.

As such, the exhaust gas heated and temperature-rising by the fuel-type surface combustion unit 140 is directed to the mixing duct portion 125, is completely mixed again by the heat in the mixing duct portion 125, and is then directed to the catalytic converter 130, such that the harmful components in the exhaust gas may be removed by a catalytic action of the catalytic converter 130. Particularly, even in the initial start, the harmful components in the exhaust gas may be effectively removed.

As described above, the catalyst may remove the harmful components in the exhaust gas while being activated only when a temperature of the catalyst rises. In the related art, it takes tens of seconds or more to activate the catalyst, but in a case of the present embodiment, it takes about several seconds to activate the catalyst, and it is thus possible to provide a more excellent effect in removing the harmful components in the exhaust gas.

Particularly, in the case of the present embodiment, it is possible to provide a more excellent effect in removing the harmful components in the exhaust gas at the initial stage of the start of the engine.

According to the present embodiment having the structure and the action as described above, it is possible to contribute to preventing air and environmental pollution because the vehicle exhaust gas abatement apparatus may effectively remove the harmful components in the exhaust gas and then discharge the exhaust gas at the initial stage of start by significantly reducing an activation temperature arrival time of the catalyst unlike a conventional electric heating manner and the exhaust gas discharging unit 110 itself may directly combust the exhaust gas to abate a predetermined amount of harmful components and smoke in the exhaust gas in advance and then move the exhaust gas to the catalytic converter 130, and to significantly improve practical utilization because the vehicle exhaust gas abatement apparatus may be easily applied to any place due to a compact and efficient structure.

Figure 5:
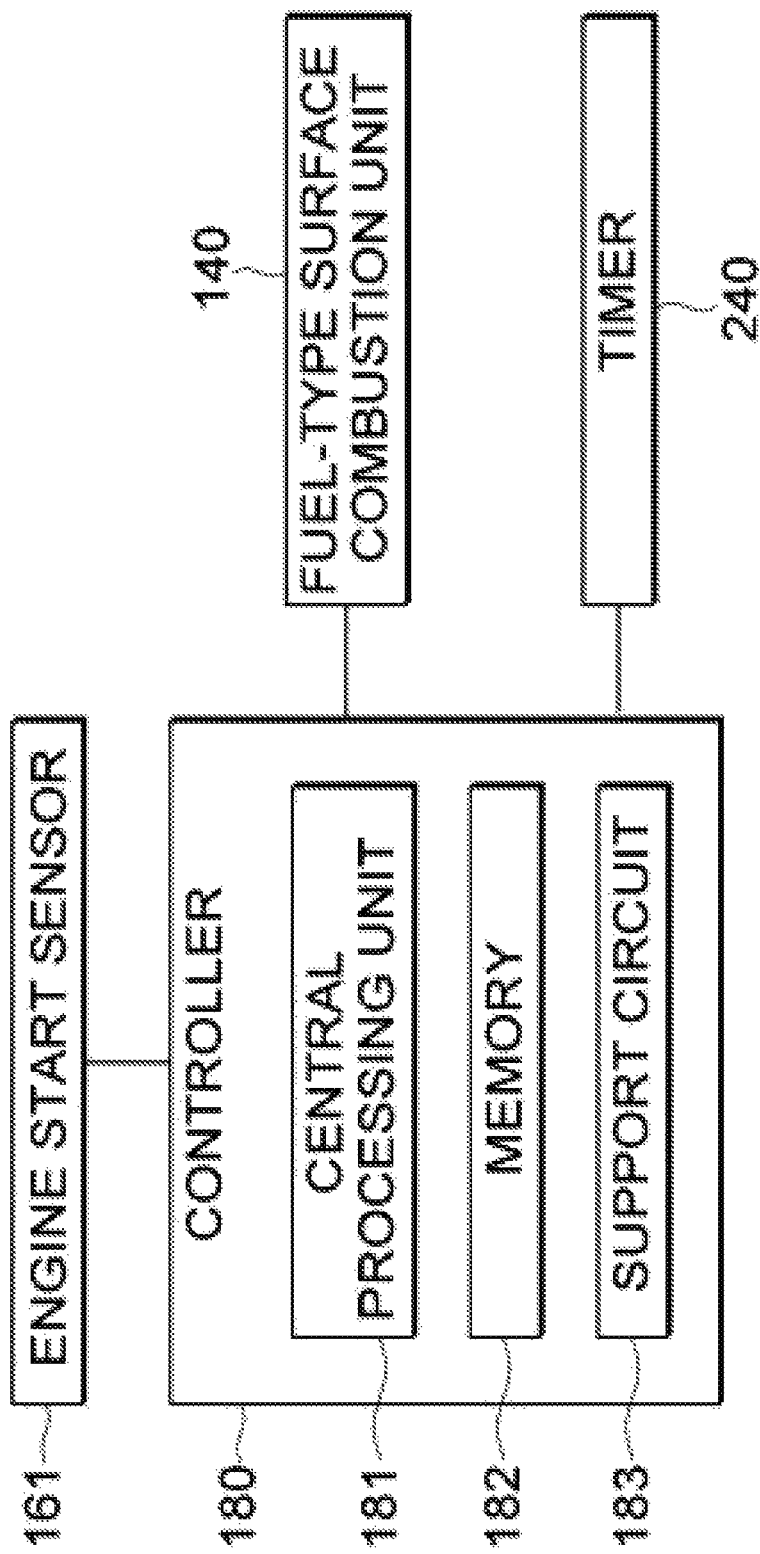
FIG. 5 is a control block diagram of a vehicle exhaust gas abatement apparatus according to a second embodiment of the present inventive concept.

FIG. 5 is a control block diagram of a vehicle exhaust gas abatement apparatus according to a second embodiment of the present inventive concept.

Referring to FIG. 5, also in a case of the present embodiment, a controller 280 controls an operation of the fuel-type surface combustion unit 140 based on a sensing signal of the engine start sensor 161. An operation of the controller 280 is the same as that of described above.

However, in the case of the present embodiment, a timer 240 is attached to the controller 280. The timer 240 serves to set an operation time of the fuel-type surface combustion unit 140.

That is, considering that the fuel-type surface combustion unit 140 needs to be operated only at the time of the initial start of the engine and needs not be operated while the vehicle is driving, for example, if the timer 240 is set to 30 seconds, the fuel-type surface combustion unit 140 is operated only for 30 seconds at the time of the initial start of the engine, and may be automatically turned off subsequently. Therefore, it is possible to prevent a phenomenon in which the fuel-type surface combustion unit 140 is unnecessarily continuously operated.

Even though the present embodiment is applied, it is possible to contribute to preventing air and environmental pollution because the vehicle exhaust gas abatement apparatus may effectively remove the harmful components in the exhaust gas and then discharge the exhaust gas unlike a conventional electric heating manner and to significantly improve practical utilization because the vehicle exhaust gas abatement apparatus may be easily applied to any place due to a compact and efficient structure.

Figure 6:
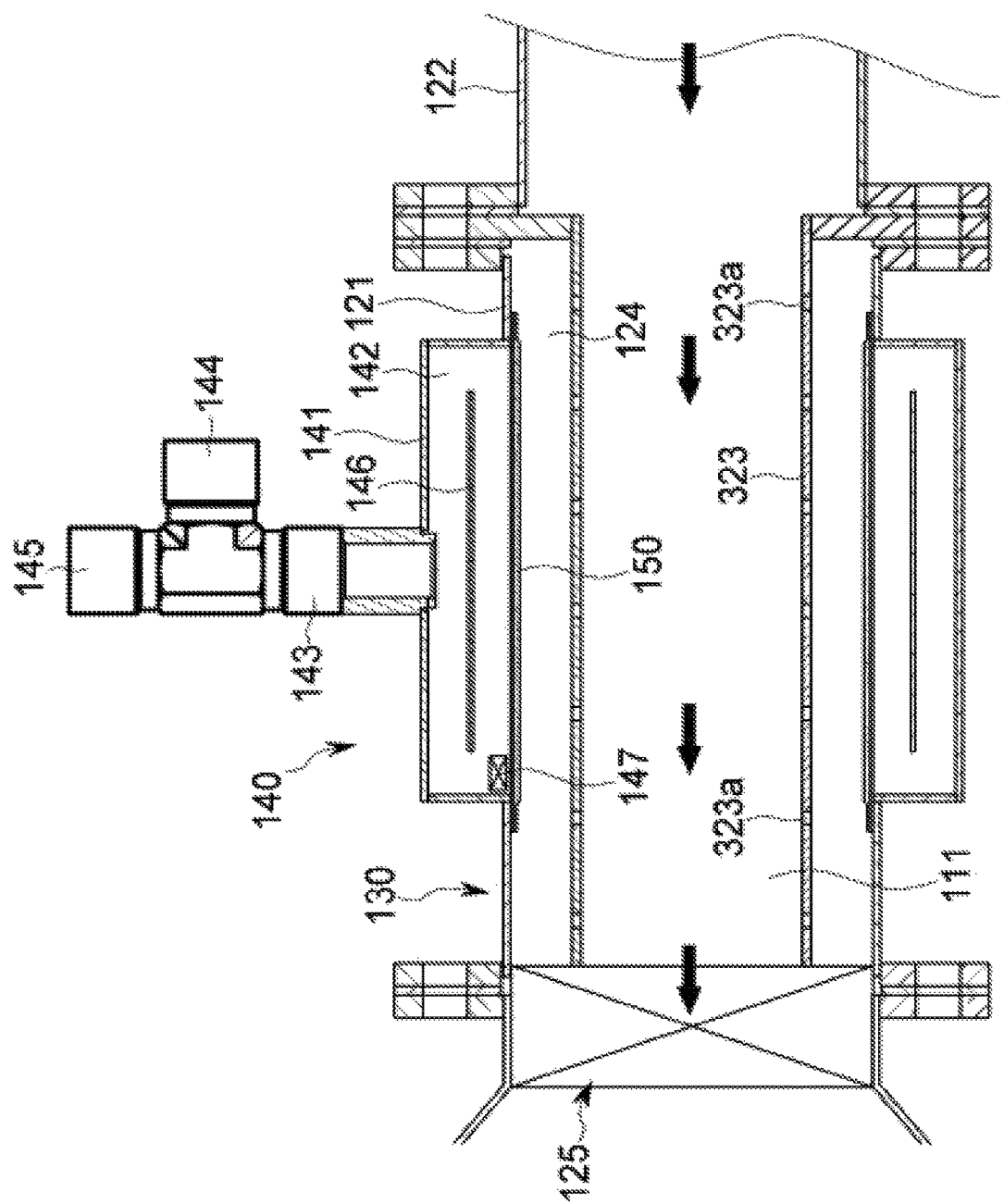
FIG. 6 is an enlarged view of main portions of a vehicle exhaust gas abatement apparatus according to a third embodiment of the present inventive concept.

FIG. 6 is an enlarged view of main portions of a vehicle exhaust gas abatement apparatus according to a third embodiment of the present inventive concept.

Referring to FIG. 6, the vehicle exhaust gas abatement apparatus according to the present embodiment may also include an exhaust gas discharging unit 310, a catalytic converter 130 (see FIG. 2), and a fuel-type surface combustion unit 140, which have the same structures and functions as those of the embodiment described above.

However, in a case of the present embodiment, a plurality of air vents 323*a* are formed in an inner partition wall portion 323, which is one component of the exhaust gas discharging unit 310, and even though the plurality of air vents 323*a* are formed in the internal partition wall portion 323, it is possible to provide an effect of the present inventive concept.

That is, even though the present embodiment is applied, it is possible to contribute to preventing air and environmental pollution because the vehicle exhaust gas abatement apparatus may effectively remove the harmful components in the exhaust gas and then discharge the exhaust gas unlike a conventional electric heating manner and to significantly improve practical utilization because the vehicle exhaust gas abatement apparatus may be easily applied to any place due to a compact and efficient structure.

As described above, it is obvious to those skilled in the art that the present inventive concept is not limited to the embodiments described above, but may be variously modified and altered without departing from the spirit and scope of the present inventive concept. Therefore, such modifications or variations are to belong to the claims of the present inventive concept.

The invention claimed is:

1. A vehicle exhaust gas abatement apparatus comprising:
    an exhaust gas discharging unit having an exhaust gas discharging pass which is formed on one side thereof and along which an exhaust gas generated from an engine of a vehicle is discharged;
    a catalytic converter connected to a rear end of the exhaust gas discharging unit along a direction in which the exhaust gas is discharged and removing harmful components in the exhaust gas using a catalyst; and
    a fuel-type surface combustion unit coupled to one side of the exhaust gas discharging unit and configured to heat an inner portion of the exhaust gas discharging unit by heat of a flame via a fuel so that the exhaust gas is heated to an activation temperature or higher of the catalyst and then arrives at the catalytic converter,
    wherein the exhaust gas discharging unit includes:
        a discharging housing portion which has a pipe shape and forms a place where the fuel-type surface combustion unit is coupled; and
        an engine connection portion which is coupled to one side of the discharging housing portion and is connected to the engine; and
    wherein the fuel-type surface combustion unit includes:
        a unit body portion which is coupled to the discharging housing portion so as to surround the discharging housing portion in an open portion of the discharging housing portion and has an inner portion forming an empty space portion;
        a supply connector which includes a fuel supply unit for supplying a fuel and an air supply unit for supplying air to be mixed with the fuel and is coupled to the unit body portion to supply the fuel and the air to the space portion in the unit body portion;
        at least one distribution guide which is provided in the space portion in the unit body portion to distribute and guide the fuel and the air directed to the space portion;
        a surface combustion mat which is disposed in an opening portion of the unit body portion in contact with the discharging housing portion; and
        an ignition module which is provided on one side of the unit body portion and is configured to allow the surface combustion mat to ignite.

2. The vehicle exhaust gas abatement apparatus of claim 1, wherein the exhaust gas discharging unit further includes an inner partition wall portion which is disposed inside the discharging housing portion in a radial direction with a spaced interval interposed between the inner partition wall portion and the discharging housing portion and has a pipe shape.

3. The vehicle exhaust gas abatement apparatus of claim 1, wherein the exhaust gas discharging unit further includes a mixing duct portion which is coupled to the other side of the discharging housing portion and is connected to the catalytic converter and in which the exhaust gas and the heat by the flame are mixed with each other.

4. The vehicle exhaust gas abatement apparatus of claim 1, further comprising:
    an engine start sensor sensing whether or not the engine is started; and
    a controller configured to control an operation of the fuel-type surface combustion unit based on a sensing signal of the engine start sensor.

5. The vehicle exhaust gas abatement apparatus of claim 4, further comprising a timer connected to the controller and setting an operation time of the fuel-type surface combustion unit,
    wherein the fuel is selected from methane, butane, propane, a self-fuel.

* * * * *